No. 708,610. Patented Sept. 9, 1902.
J. ZELLY.
FASTENING DEVICE FOR PINS.
(Application filed Oct. 5, 1901.)
(No Model.) 2 Sheets—Sheet 1.
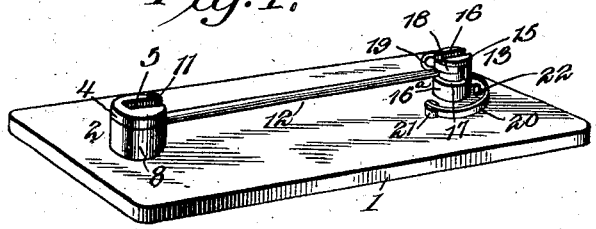
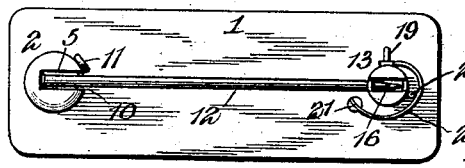
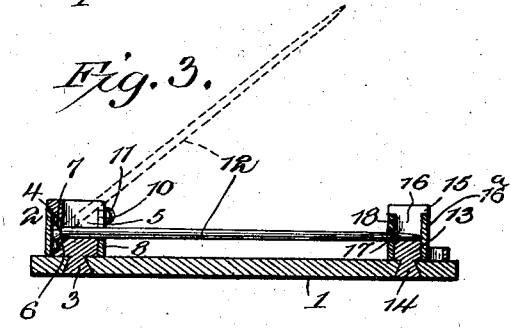
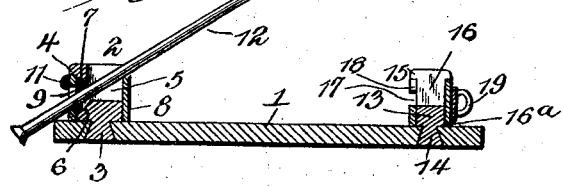
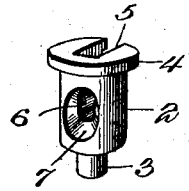
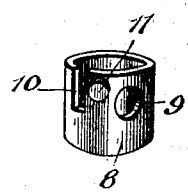
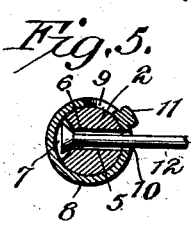
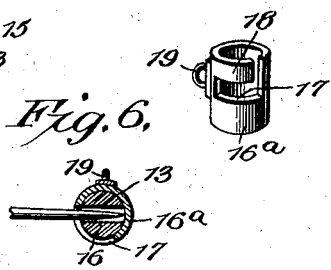
John Zelly, Inventor:
Witnesses No. 708,610. Patented Sept. 9, 1902.
J. ZELLY.
FASTENING DEVICE FOR PINS.
(Application filed Oct. 5, 1901.)
(No Model.) 2 Sheets—Sheet 2.
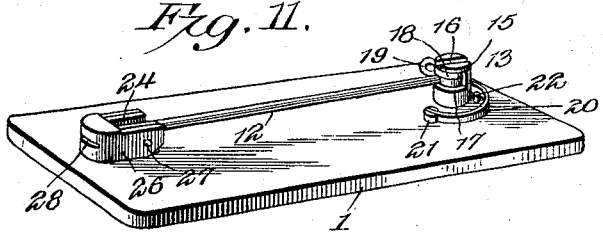
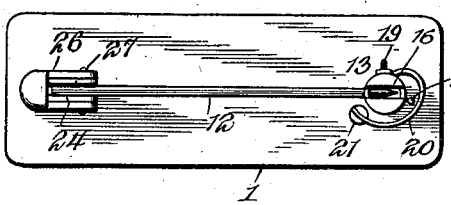
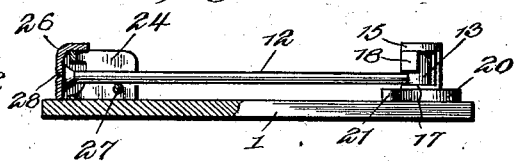
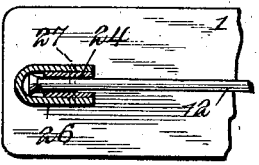
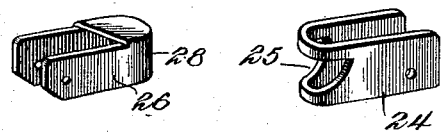
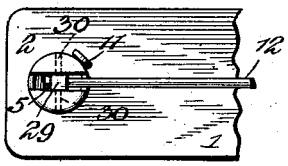
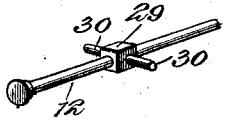
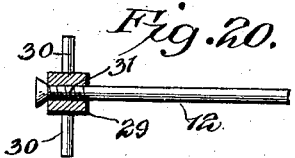
John Zelly, Inventor:
By C. G. Siggers
Attorney
Witnesses
Howard P. Orr.
H. J. Shepard.

UNITED STATES PATENT OFFICE.

JOHN ZELLY, OF EATON, OHIO.

FASTENING DEVICE FOR PINS.

SPECIFICATION forming part of Letters Patent No. 708,610, dated September 9, 1902.

Application filed October 5, 1901. Serial No. 77,732. (No model.)

*To all whom it may concern:*

Be it known that I, JOHN ZELLY, a citizen of the United States, residing at Eaton, in the county of Preble and State of Ohio, have invented a new and useful Fastening Device for Pins, of which the following is a specification.

This invention relates to breastpins, brooches, and the like which have pivotal pin-tongues, and has for its object to provide an improved mounting for pin-tongues whereby the latter may be conveniently and effectually secured at opposite ends to the base-plate of the pin and may be readily replaced by an ordinary headed pin without the assistance of a jeweler. It is furthermore designed to prevent accidental displacement or looseness of the hinged joint of the pin and at the same time to permit free movement of the pin-tongue upon its hinged joint.

A further object is to provide for securing the pin-point without snapping the same laterally into engagement with a hooked spring-catch and to effectually prevent accidental displacement of the pin from the catch.

A final object is to have the invention capable of application to pins already in use without altering or changing the same and to preserve the strength and durability of the pin-tongue fastenings.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of the base-plate of a pin having the present invention applied thereto. Fig. 2 is a plan view thereof. Fig. 3 is a longitudinal sectional view. Fig. 4 is a similar view showing the manner of applying and removing the pin-tongue. Fig. 5 is a cross-sectional view taken through the hinged joint. Fig. 6 is a similar view taken through the fastening for the free end of the tongue. Fig. 7 is a detail perspective view of the hinge-post. Fig. 8 is a detail perspective view of the locking sleeve or collar for the hinge-post. Fig. 9 is a detail perspective view of the catch-post. Fig. 10 is a similar view of the locking-sleeve therefor. Fig. 11 is a perspective view showing a modified form of hinged joint. Fig. 12 is a plan view thereof. Fig. 13 is a side elevation with the hinged joint in section. Fig. 14 is a cross-sectional view of the hinged joint. Fig. 15 is a detail perspective view of the modified hinge-post. Fig. 16 is a detail perspective view of the hinged cap for locking the pin to the hinge-post. Fig. 17 is a top plan view of a further modified form of hinge-joint. Fig. 18 is a detail perspective view of the pivotal bearing of the latter form of the device. Fig. 19 is a perspective view of a modified sleeve for the preferred form of hinged joint. Fig. 20 is a detail sectional view of the bearing illustrated in Fig. 18 and showing a screw-threaded connection between the pin-tongue and the bearing.

Like characters of reference designate corresponding parts in all the figures of the drawings.

Referring at first more particularly to Figs. 1 to 10, inclusive, which illustrate the preferred form of my invention, it will be seen that 1 designates a base-plate of a breastpin, brooch, or the like, and although shown in the drawings as rectangular in shape it will of course be understood that it may assume any shape according to the design of the pin. For the hinged joint of the pin-tongue there is provided a cylindrical post 2, which has its lower end provided with a reduced stud portion 3, that is riveted or otherwise secured to the base-plate, and the opposite end of the post is provided with an outwardly-directed marginal flange or shoulder 4, the inner side of the post being provided with a vertical bifurcation 5, which opens outwardly through the outer end of the post. A diametric opening 6 is formed through the post, so as to communicate with and also lie in the plane of the bifurcation 5, the outer end of said opening being flared, so as to form a socket 7. Upon this post there is rotatably mounted a sleeve or collar 8, which is held against endwise movement by the base-plate 1 and flange or shoulder 4 of the post. This sleeve is provided with a perforation or opening 9 and a longitudinal slot or bifurcation 10, formed in the outer edge thereof, and it is also provided with an outwardly-directed stud or projection 11 to form a finger-piece for the adjustable rotation of the sleeve. To apply a pin to the hinge-post, as indicated in Fig. 4, the sleeve or collar 8 is rotated until its opening 9 registers with the socket 7 in the outer side of the post, after which an ordinary headed pin 12 is thrust through the opening 9 in the sleeve and also through the opening and slot in the post until the head of the pin is received within the socket 7, and then the sleeve is turned until the slot or bifurcation 10 registers with the inner open edge of the bifurcation in the post, when the pin will drop into the slot of the sleeve, as indicated in Fig. 3, and so long as the pin remains in this slot the sleeve is locked against accidental movement, and at the same time the pin may be raised and lowered upon the loose or hinge joint formed by the head of the pin fitted within the socket 7 in the outer side of the post. It will of course be understood that the pin may be removed by a reversal of the operation just described, wherefore it is apparent that the pin-tongue may be readily replaced should it become broken, bent, or otherwise damaged without the assistance of a jeweler. A similar fastening is provided for the point or free end of the pin-tongue and consists of a post 13, having one end provided with a reduced stud or projection 14, that is riveted or otherwise secured to the base-plate 1 and has its upper end provided with an outwardly-directed marginal flange or shoulder 15 and is also longitudinally bifurcated, as indicated at 16. The longitudinal bifurcations of the two posts are alined longitudinally of the base-plate, so that the free end of the pin may readily drop into the bifurcation of the catch-post. Upon this post there is rotatably mounted a sleeve 16$^a$, which is held against accidental endwise movement by the flange 15 and the base-plate 1 and is also provided with a bayonet-slot 17, which has one member opening outwardly through the outer edge of the sleeve and adapted to be alined with the inner edge of the bifurcation of the post, so that the free end of the pin may also enter the bayonet-slot, after which the sleeve may be turned so as to receive the end of the pin in the other member of the slot, whereby the tongue portion 18 of the sleeve which is produced by the bayonet-slot overhangs the free end of the pin, and thereby locks the same, so as to obviate accidental displacement thereof from the bifurcated post. A suitable finger-piece 19 is projected outwardly from the sleeve to facilitate the manipulation thereof. A bowed spring 20 loosely embraces the catch-post and has one end connected to the base-plate, as indicated at 21, the opposite free end of the spring being secured to the catch-sleeve in any suitable manner, so as to normally hold the sleeve in its locked position and also to snap the sleeve back to its locked position after it has been turned therefrom and then released. A suitable stop projection 22 is carried by the plate and located in the path of the finger-piece 19, so as to limit the movement of the locking-sleeve and to insure a proper alinement of the bayonet-slot with the bifurcation of the catch-post, thereby to facilitate the releasing of the free end of the pin-tongue.

From the foregoing description it is apparent that the hinged joint and the catch embody several points of similarity, as they both have a slotted post for the reception of one end of the pin and also a rotatable locking-sleeve, which is adjustable to permit of the pin being inserted into the bifurcation of the post and also for locking the pin after it has been engaged with the post.

Instead of having separate openings 9 and 10 in the locking-sleeve 8 of the hinge-post there may be a single opening 23, as indicated in Fig. 19, said opening being of a size to receive the head of the pin and also intersecting the outer edge of the sleeve. However, the first-described form of sleeve is preferred, as the bifurcation 10 may be comparatively narrow, so as to snugly embrace the pin 12, and thereby obviate looseness of the sleeve, while in the form shown in Fig. 19 a comparatively large opening 23 will permit of considerable looseness of the sleeve.

A modified form of hinged joint has been illustrated in Figs. 11 to 16, inclusive, wherein the post 24 is preferably formed from a single blank of metal, which is folded into substantially U shape and secured edgewise to the base-plate, so as to form a bifurcated post, with the inner edge of the bifurcation open. The back or outer side of the post is provided with a notch 25, the lower edge of which is rounded, so as to form a concaved socket, through which the pin-tongue 12 is adapted to be inserted and for the reception of the head of the pin, whereby the latter may work in the socket to form a hinged joint. To prevent displacement of the pin, there is provided a substantially U-shaped keeper 26, which straddles the post and is pivotally connected thereto, as at 27, and adapted to have its closed end snapped over the outer end of the post, so as to cover the socket therein, and thereby prevent outward endwise displacement of the pin. The outer closed end of the cap or keeper is provided with a finger-notch 28 to facilitate the outward swinging of the keeper when it is desired to remove the pin. As best indicated in Fig. 13, it will be seen that the pivot 27 forms a stop upon which the pin 12 rests, so as to support the same substantially parallel with the base-plate and in position for engagement by the catch, the latter being the same as hereinbefore described.

Another form of hinged joint has been shown in Figs. 17 and 18, the hinge-post and keeper or locking-sleeve being the same as that shown in the preferred form of the device, and in addition thereto there is provided a pivot-bearing 29, which is provided with an opening for the reception of the pin-tongue 12 and is designed to be received within the bifurcated portion of the post and also provided with opposite pivot-studs 30, which are pivotally received within suitable openings in opposite sides of the post, the latter being originally split to permit of the insertion of the pivot-studs and then hammered together or otherwise closed, so as to prevent displacement of the pivot-bearing.

It is also designed to have an interlocked connection between the pin-tongue and the bearing 29, as illustrated in Fig. 20 of the drawings, wherein the pin is provided with a screw-threaded portion 31 adjacent to the head, the bore of the bearing 29 also being correspondingly screw-threaded to receive this screw-threaded portion of the pin, whereby endwise looseness of the latter is prevented.

From the foregoing description it is apparent that the present invention may be applied to breastpins and the like already in use without altering or changing the same in any manner whatsoever, and when the pin-tongue has become broken or damaged it may be readily replaced by an ordinary headed pin, as the hinge-joint is expressly provided for this purpose. Moreover, the hinge and catch posts are securely fastened to the base-plate, so as to effectually obviate any looseness of these parts, and the hinged connection between the head of the pin and the hinge-post is also arranged to prevent unnecessary looseness and at the same time to permit of the required hinge movement of the pin for engagement and disengagement of the free end thereof with the catch.

It is desired to call attention to the fact that while the parts 8 and 16ª are swiveled or rotatably mounted upon the respective posts and the part 26 is hinged to its post, yet all these parts movably embrace the posts and are pivotally connected thereto in the broad acceptance of this term, and therefore as these parts are designed to prevent displacement of the pin-tongues from the respective posts I have called the same "pivotal keepers" in setting them forth in the claims, as this term is common to all of the forms of keepers.

What I claim is—

1. In a breastpin or the like, the combination with a base-plate, of opposite slotted posts having their slots in mutual alinement, the back of one of the posts having a socket formed therein and communicating with the adjacent edge of the slot thereof, a headed pin thrust through the socket into the slot and having its head loosely received within the socket, the opposite free end of the pin being adapted to be seated in the slot of the other post, and pivotal keepers embracing the respective posts and constructed to prevent accidental displacement of the adjacent ends of the pin.

2. In a breastpin and the like, the combination of a hinge-post having a longitudinal slot formed in one side, and an opening formed in the opposite side and communicating with the slot, a headed pin thrust through the opening in the post with its head received loosely therein and its shank portion working in the slot thereof, and means permanently carried by the post for covering and uncovering the opening therein and to permit insertion and removal of the pin.

3. In a breastpin and the like, the combination of a hinge-post having a longitudinal slot formed in one side, and an opening formed in the opposite side, and communicating with the slot, a headed pin thrust through the opening with its head received loosely therein and its shank working in the slot, and a sleeve permanently swiveled upon the post and having an opening capable of being alined with the opening in the post to uncover the head of the pin.

4. In a breastpin and the like, the combination with a base-plate, of a slotted post projected therefrom and having a socket formed in one side thereof and in communication with the slot, a headed pin-tongue inserted through the socket and the slot with its head loosely received within the socket, and a pivotal keeper embracing the post and constructed to normally lie across the socket to prevent outward displacement of the pin-tongue.

5. A hinge-joint for breastpins and the like, comprising a slotted post having a socket formed in the outer side and communicating with the slot, a headed pin thrust through the socket and the slot and having its head loosely received within the socket, and a pivotal keeper embracing the post and constructed to cover and uncover the socket therein.

6. A hinge-joint for breastpins and the like, comprising a slotted post having a socket formed in its outer side and communicating with the slot, a headed pin thrust through the socket and the slot and having its head loosely received within the socket, a locking-sleeve swiveled upon the post and having an opening to uncover the socket, and also provided in its outer edge with a notch or slot to receive the projected portion of the pin.

7. A hinge-joint for breastpins and the like, comprising a slotted post having a socket formed in its outer side and in communication with one edge of the slot, the outer end of the post having an outwardly-directed marginal flange, a headed pin thrust through the socket and the slot and having its head loosely received within the socket, and a locking-sleeve swiveled upon the post at the inner side of the flange and having an opening to be registered with the socket and also provided with a notch or slot in its outer edge to be normally registered with the opposite edge of the slot.

8. In a breastpin or the like, the combination with a base-plate, of opposite slotted posts projected therefrom and having their slots mutually alined, one of the posts having a socket provided in its outer side and in communication with the slot, a headed pin thrust through the socket and the slot with its head loosely seated in the socket, and keeper-sleeves swiveled upon the respective posts and constructed to lock the adjacent ends of the pin against accidental displacement from the respective posts.

9. In a breastpin or the like, the combination with a base-plate, of opposite slotted posts projected therefrom and having their slots mutually alined, one of the posts having a socket formed in its outer side and in communication with the adjacent slot, a headed pin thrust through the socket and the slot with its head loosely received within the socket and its opposite free end adapted to enter the slot of the other post, a locking-sleeve swiveled upon the socketed post and provided with an opening to register with the socket and also having a notch or slot formed in its outer edge for normal alinement with the inner edge of the slot, and another locking-sleeve swiveled upon the other post and provided with a bayonet-slot to receive and lock the adjacent free end of the pin.

10. A pin-tongue fastener, comprising a stationary post having a longitudinal slot opening outwardly through its outer end, and a keeper comprising a sleeve embracing the slotted portion of the post and permanently swiveled thereon, the sleeve being provided with a substantially L-shaped slot, one member of which is disposed transversely with respect to the slot in the post and located intermediate of the opposite ends thereof, and the other member of the slot opening outwardly through the outer end of the sleeve and adapted to be alined with the slot in the post.

11. The combination with the base-plate of a breastpin and the like, of a pin-tongue fastener comprising a cylindrical post carried by and projected at substantially right angles to the plate and provided with a longitudinal slot opening outwardly through the outer end of the post, and a tubular keeper embracing and permanently swiveled upon the cylindrical slotted portion of the post to cover and uncover the slot.

In testimony that I claim the foregoing as my own I have hereto affixed my signature in the presence of two witnesses.

JOHN ZELLY.

Witnesses:
 JAS. H. BEATTY,
 R. W. QUINN.